United States Patent [19]

Venable

[11] 4,119,000
[45] Oct. 10, 1978

[54] REMOTE CONTROL ASSEMBLY

[75] Inventor: Phillip G. Venable, Orion, Ill.

[73] Assignee: J. I. Case Company, Racine, Wis.

[21] Appl. No.: 796,091

[22] Filed: May 12, 1977

[51] Int. Cl.² ............................................. G05G 11/00
[52] U.S. Cl. ................................... 74/479; 74/480 R; 60/479
[58] Field of Search ................ 74/479, 480 R, 483 R; 92/12.1; 60/479

[56] References Cited

U.S. PATENT DOCUMENTS

| 3,128,738 | 4/1964 | Farrington et al. | 74/479 UX |
| 3,651,709 | 3/1972 | Booty et al. | 74/483 R |
| 3,902,379 | 9/1975 | Bennett et al. | 74/480 R |

Primary Examiner—Edgar W. Geoghegan
Attorney, Agent, or Firm—Cullen, Sloman, Cantor, Grauer, Scott, & Rutherford

[57] ABSTRACT

An improved remote control assembly for mechanically controlling the operation of a hydrostatic pump which may be used to power the attachments on a tractor-like vehicle. The assembly includes a first control unit positioned at a first remote location on the tractor and a second control unit positioned at a separate and distinct remote location. The assembly includes a control arm secured to a pump control element whose rotation controls the pump operation. A pivot arm is pivotally carried by the control arm and has a first control cable from the first control unit connected to one end and a second control cable from the second control unit connected to the opposite end. The assembly is configured such that when the first control unit is locked in a neutral position, the second control unit is operable to rotate the pivot member about its first end to operate the control arm and when the second control unit is locked in a neutral position, the first control unit is operable to rotate the pivot arm about the opposite end to operate the control arm thereby enabling the pump to be selectively controlled from either of the two remote locations.

22 Claims, 10 Drawing Figures

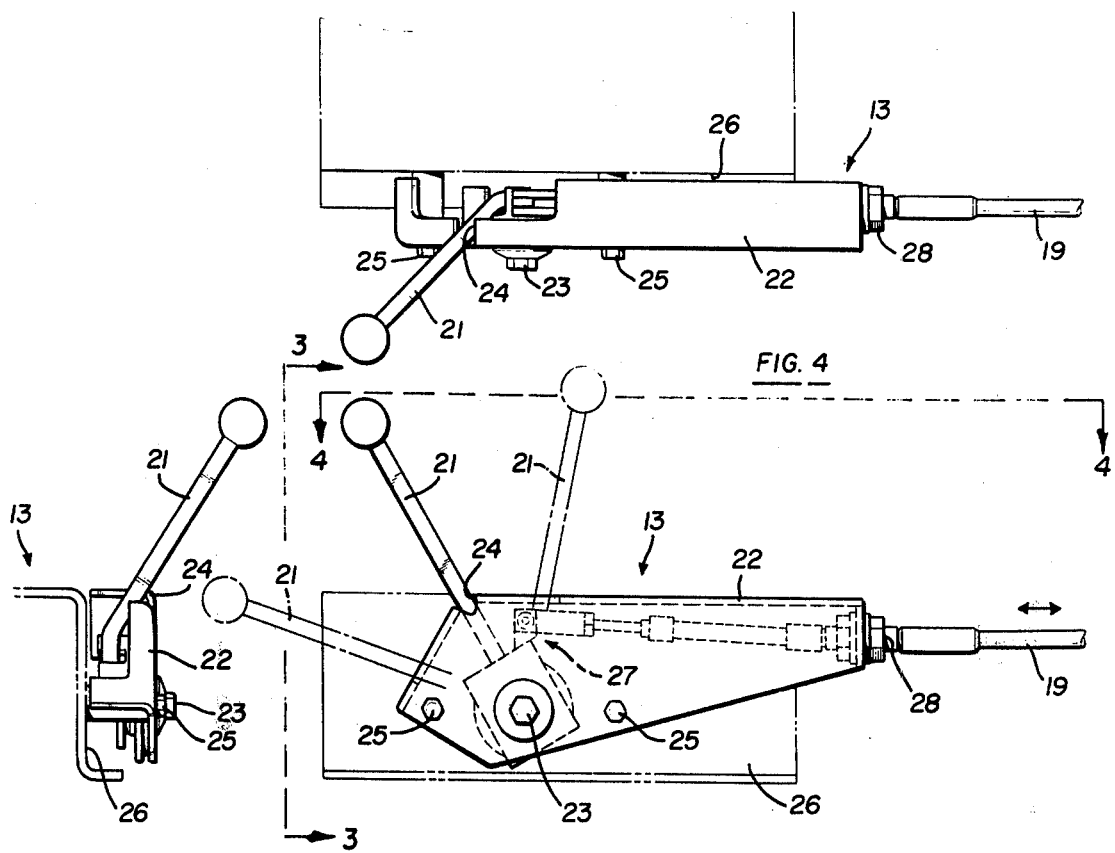

REMOTE CONTROL ASSEMBLY

BACKGROUND OF THE INVENTION

1. Field of the Invention

The remote control assembly of this invention relate generally to an assembly for mechanically rotating the control element from either of two separate and distinct remote locations and more particularly to an assembly which allows a hydrostatic pump which operates the attachments on a tractor-like vehicle to be controlled from either of two separate and distinct remote locations on the tractor.

2. Description of the Prior Art

Various types of mechanisms have been used in the prior art to remotely control the rotation of the control element for operating a hydrostatic pump or the like. Typically, a single remote control unit is used to rotate the control element but instances arise wherein it is preferable to be able to control the operation of a hydrostatic pump or similar element from two different and distinct remote control locations.

The prior art attempts at operating a single control element from two different and distinct remote control locations have been relatively unsuccessful. Most have involved relatively expensive and complex mechanical mechanisms readily susceptible to mechanical breakdown.

Thus, a relatively simple, inexpensive, trouble-free mechanism which is easy to install and easy to use has not been available nor has such a remote control assembly which can be quickly and easily converted for operation from a single remote control location.

SUMMARY OF THE INVENTION

The remote control system of the present invention can be used for selectively rotating a control element clockwise and counter-clockwise about its longitudinal axis to control the operation of a mechanical device. The remote control system includes a control arm having first and second portions spaced from one another with the first portion being secured to the control element for rotating same. A pivot member or link is pivotally mounted on a second portion of the control arm intermediate opposite end portions of the link. A first manually operable remote control means is coupled to one end of the link for selectively pivoting the link about its opposite end to control the direction of rotation of the control arm for selectively operating the mechanical device. A second manually operable remote control means is coupled to the opposite end portion of the link for selectively pivoting the link about the first end portion to selectively control the direction of rotation of the control arm to control the operation of the mechanical device thereby enabling the device to be operated from either of the first or second remote control means.

In the preferred embodiment, the first manually operable remote control means includes a first control cable having its control end operably connected to the first end portion of the link or pivot member and a control lever for longitudinally moving the control cable back and forth to pivot the link and rotate the control arm. The control lever is also positionable to lock the first cable in the neutral cable position.

Similarly, the second cable control means includes a second control cable having its control end operably coupled to the opposite end of the link or pivot member. The second control cable means also includes a control lever for longitudinally moving the first or the second control cable back and forth to pivot the link member and rotate the control arm. The control lever of the second cable control means is positionable to lock the second control cable in a neutral cable position.

In the preferred embodiment of the present invention, the control arm includes a first generally planar portion adapted to be rigidly secured to the control element for rotating same and a second generally planar portion which is generally parallel to the first portion and which is adapted to operatively carry a pivot means. An intermediate portion integral with opposite ends of the first and second portions is generally perpendicular to the planes thereof and is adapted for spacing the second portion from the first portion. The pivot member or link includes a substantially flat generally rectangular element having a central aperture means intermediate the opposite ends thereof for receiving the pivot means therethrough to rotate the pivot member or link with respect to the control arm. A first end portion of the pivot member is adapted to operatively engage the control end of the first control cable and the opposite end portion of the pivot member or link is adapted to operatively engage the control end of the second control cable.

As a further feature of the remote control assembly of the present invention an adapter means may be provided for rigidly securing the control arm to the pivot arm to prevent relative movement therebetween so as to enable the first control cable means to selectively rotate the control element by itself whenever the second control cable is disconnected from the opposite end portion of the pivot member or link.

Accordingly, the present invention enables a single control element to be selectively operated from either of two different and distinct remote locations without encountering the previously enumerated and discussed prior art problems. Other advantages and meritorious features of the present invention will be more fully understood from the following description of the preferred embodiment, the appended claims and the drawings which are briefly described hereinbelow.

BRIEF DESCRIPTION OF THE DRAWINGS

FIG. 2 is a side view of a remote control unit utilized in the remote control assembly of the present invention;

FIG. 3 is a sectional view of the remote control unit of FIG. 2 taken along view lines 3—3 thereof;

FIG. 4 is a top view of the remote control unit of FIG. 2 taken along view lines 4—4 thereof;

DESCRIPTION OF THE PREFERRED EMBODIMENT

Figure 1:
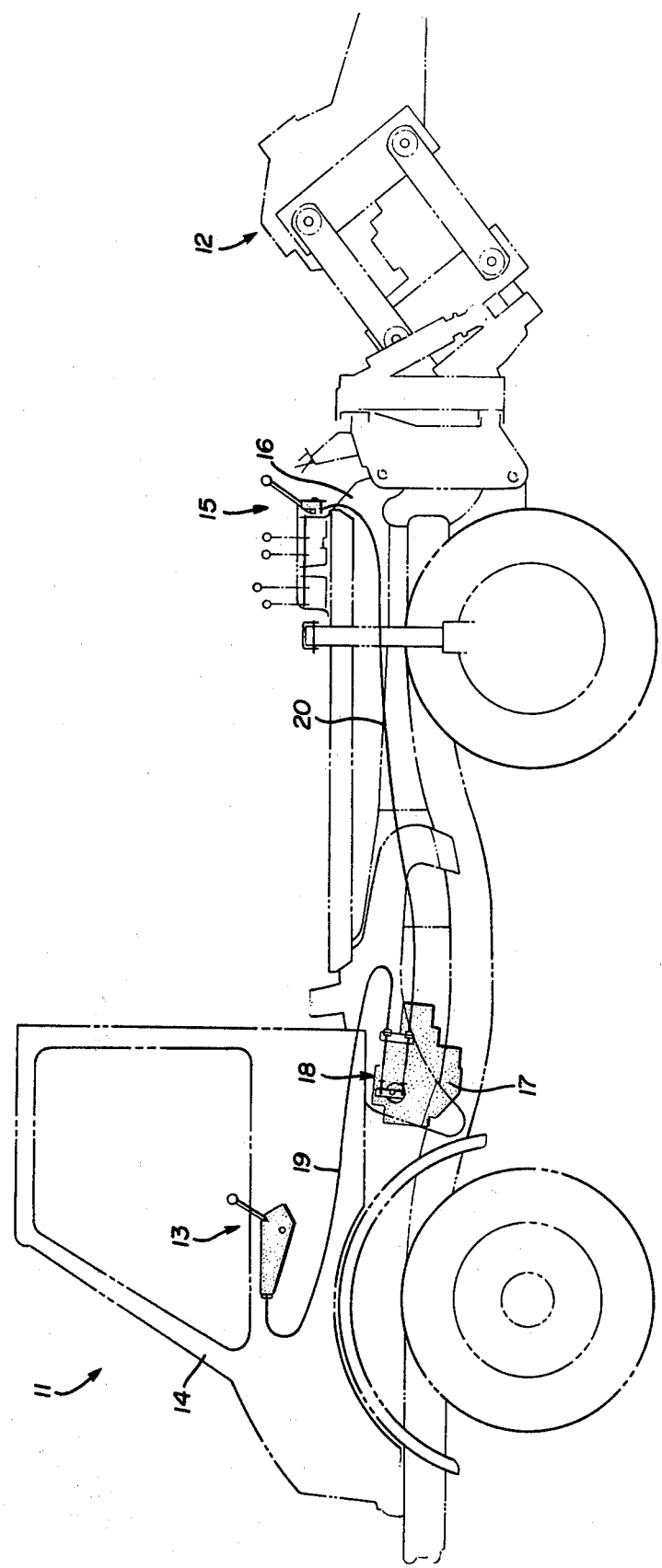
FIG. 1 is a side view, partially in phantom, of a conventional tractor-type vehicle having the improved remote control assembly of the present invention installed thereon.

FIG. 1 illustrates the conventional tractor-like vehicle 11 designed for operating one or more tractor attachments 12 (only partially shown) for performing various tasks such as trenching and the like. FIG. 1 is included herein to illustrate a typical environment for the improved remote control assembly of the present invention.

The remote control assembly of the present invention includes a first remote control unit 13 positioned at a first remote location on the vehicle such as in the driver's cab 14 and a second remote control unit 15 positioned at a second different and distinct location 16 such as external to the cab 14 at the rear of the vehicle 11. A conventional hydrostatic pump 17 is used to power the various attachments 12 that are available for use with the tractor 11. In the embodiment of FIG. 1, the hydrostatic pump 17 is attached to the transmission of the tractor 11 while a conventional hydraulic motor, not shown, will be furnished with the attachment portion 12 so that the hydrostatic pump 17 can be used to operate the hydraulic motor and hence the attachments 12 as conventionally known.

The remote control assembly of FIG. 1 includes a control assembly indicated generally at 18 for controlling the operation of the hydrostatic pump 17 from either of the two remote locations 14, 16. The first control unit 13 can operate the control assembly 18 via a first control cable 19 or the second remote control unit 15 can be used to operate the control assembly 18 via a second control cable 20 as hereinafter described.

The preferred embodiment of the first control unit 13 will now be described with reference to FIGS. 2-4 and for the purpose of describing the remote control assembly of the present invention, but this description may be taken as applying to the second remote control mechanism 15 as well. The remote control unit 13 is designed with a forward and a reverse mode and with a neutral lock or detent. The remote control unit 13 includes a manually operable control lever 21 and a housing 22. The lever 21 is mounted for rotation about the axis of pivot means 23 so that it can be manually positioned in the locked neutral position by displacing the lever 21 sideways into the notch 24 of the housing 22 as shown in FIGS. 2-4. As shown in phantom lines in FIG. 2, the lever 21 may be operated in the reverse mode by positioning it to the left of the notch 24 and in the forward mode by positioning it to the right or forward of the notch 24.

The housing 22 is secured via fastening elements 25 to a plate 26 on the tractor 11 for securing it thereto. A first control cable 19 has one end attached via attachment assembly 27 to the control lever 21 such that the forward and reverse positioning of the lever 21 causes the cable 19 to move longitudinally as indicated by the arrow in FIG. 2. A sheath assembly 28 may be secured to the housing 22 so as to guide the cable 19 as it is longitudinally positioned by operation of the control lever 21, as conventionally known.

Figure 5:
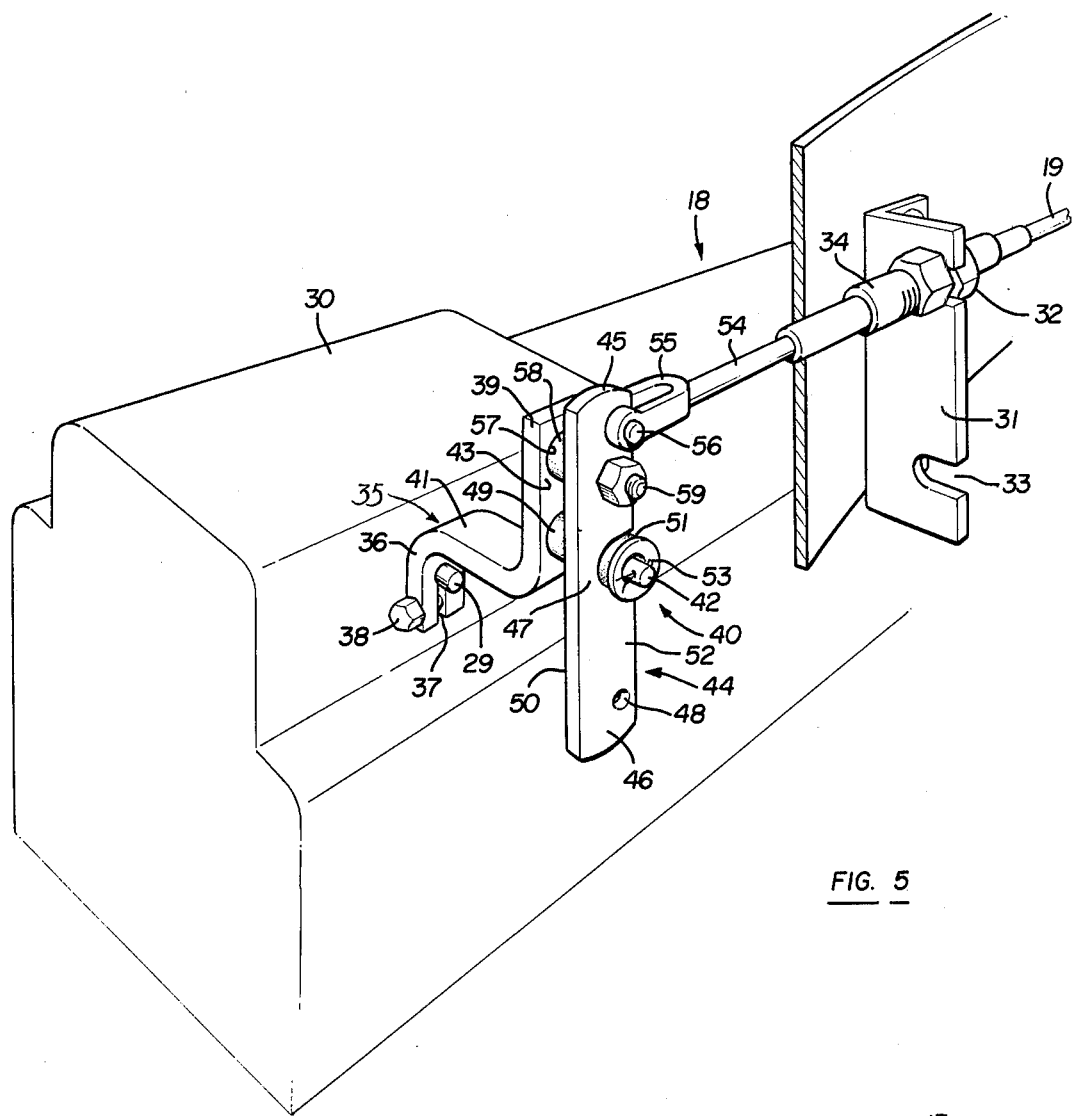
FIG. 5 is a fragmentary perspective view of a hydrostatic pump provided with an embodiment of the remote control assembly of the present invention adapted to be operated from a single remote location.

FIG. 5 illustrates the control assembly 18 as it is operatively attached to the rotatable control element 29 of a conventional hydrostatic pump 30 (reference numeral 17 in FIG. 1) such that the direction and degree of rotation of the pump control element 29 controls the operation of the pump 30. A slotted guide member having an L-shaped cross section has one portion provided with an upper slot 32 and a lower slot 33 while the opposite portion is securely anchored, by conventional means, to some portion of the tractor 11. A cable sheath anchoring assembly 34 is secured within the slot 32 and receives the first control cable 19 therethrough so that it is guided in its longitudinal motion when the control lever 21 of the remote control unit 13 is moved between the various positions.

A control arm 35 has a first step portion 36 having a U-shaped slot 37 in the end thereof which is adapted to be secured to the control element 29 by positioning the control element 29 within the slot 37 and then securing the ends of the slot together by means of a bolt fastener 38 or the like so that the rotation of the control arm 35 about the longitudinal axis of the control element 29 causes clockwise or counter-clockwise rotation of the control element 29. The control arm 35 also includes a second step portion 39 which is generally parallel to the plane of the first step portion 36 and is adapted to operatively carry a pivot means 40 thereon. An intermediate portion 41 integral with the first step portion 36 and the second step portion 39 and generally perpendicular to the planes thereof is provided for rigidly connecting the first step portion 36 to the second step portion 39 while spacing the plane of the second step portion 39 a predetermined distance away from the plane of the first step portion 36.

The pivot assembly 40 includes an elongated pin 42 carried by the outer surface 43 of the second step portion 39 and extending outwardly therefrom in a direction generally parallel to the plane of the intermediate portion 41. A substantially flat generally rectangular pivot member or link 44 is pivotally mounted to the pivot pin 42 for rotation thereabout. The pivot member 44 has a first end portion 45, a second end portion 46, and an intermediate portion 47 adapted to be pivotally carried by the pin 42. The first end 45 includes a first outer aperture 62 and an intermediate aperture 61 while the opposite end 46 of the link 44 includes a second outer aperture 48. The pivot assembly 40 may include an annular collar or sleeve about a central aperture. A first sleeve portion 49 extends from one surface 50 of the pivot member 44 so that its distal end is disposed adjacent the surface 43 of the second step portion 39 of the control arm 35 and a second sleeve or collar portion 51 extends outwardly from the opposite surface 52 of the pivot member 44 so that the sleeves 49, 51 are disposed on opposite sides of the central aperture. The sleeve portions 49 and 51 are slideably disposed over the pivot pin 42 and secured thereto by means of a cotter pin 53 or the like so that the pivot member or link 44 is free to pivotally rotate about the longitudinal axis of the pin 42.

In the embodiment of FIG. 5, the remote control apparatus is configured so that it can be operated from a single remote control location, such as from the first remote control unit 13, when the control cable 20 of the second remote control unit 15 is disconnected. The control end 54 of the cable 19 extends out of the anchoring sheath assembly 34 and is operatively connected to the first end 45 of the link 44. The control end 54 of the cable 19 may include a U-shaped yoke assembly 55 adapted to have the opposing legs thereof disposed on either side 50, 52 of the pivot member 44 so that a pin element 56 may be passed through the ends of the legs of the yoke assembly 55 and through the first aperture 60 of the first end portion 45 of the link 44 so as to operatively connect the cable 19 thereto.

In the embodiment of FIG. 5, an adapter assembly 57 is provided for rigidly securing the control arm 35 to the link 44 to prevent relative motion therebetween so that the control element 29 of the hydrostatic pump 30 may be controlled solely by use of the first control cable 19. The second step portion 39 includes an outer aperture 60 and the pivot element 44 includes an intermediate aperture 61 disposed between the intermediate portion 47 of the link 44 and the first outer aperture 62 of the first end portion 45. The adaptor 57 includes a sleeve or collar 58 which is interposed between the outer surface 43 of the second step portion 39 and the inner surface 50 of the first end portion 45 of the link 44 such that a bolt of a conventional bolt and nut assembly 59 may be passed through the aperture 60, the sleeve 58, and the aperture 61 and may then be rigidly secured thereto by means of a nut so as to prevent relative movement of the link 44 with respect to the control arm 35.

Figure 6:
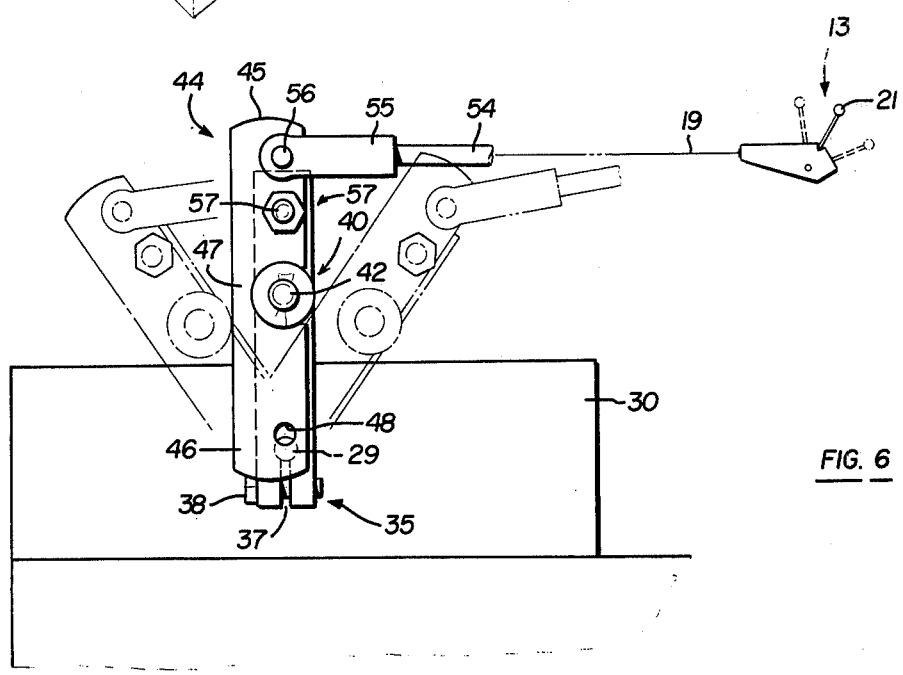
FIG. 6 is a schematic illustration to explain the operation of the embodiment of the remote control assembly of FIG. 5.

The operation of the embodiment of FIG. 5 including the adapter 57 will be briefly described with reference to FIG. 6. When the control lever 21 of the first control unit 13 is in the locked neutral position, the first cable 19 positions the link 44 and the control arm 35 which is rigidly secured thereto by means of the pivot assembly 40 and adapter 57 in a generally upright position so that the control element 29 maintains the hydrostatic pump 30 in a neutral state. As the control lever 21 of the first remote control unit 13 is moved back and forth in a forward mode or reverse mode, as shown by the phantom control levers of FIG. 6, the rigidly coupled control arm 35 and link 44 combination is pivoted about the longitudinal axis of the control element 29 so as to rotate the control element 29 in a counter-clockwise or clockwise direction as indicated by the phantom line positions in FIG. 6.

The configuration of the control assembly 18 of the preferred embodiment of the present invention is illustrated in FIGS. 7 through 10. In the preferred embodiment, the adapter 57 is removed and the control end of the second cable 20 is operatively connected to the second or opposite end portion 46 of the pivot member 44. The control end of the cable 20 may be provided with a U-shaped yoke assembly 63 having apertures provided in the end portions thereof so that the opposite end portion 46 of the link 44 may be inserted between the ends of the yoke assembly 63 and a pin 64 or similar connecting means is inserted through the ends of the yoke assembly 63 and through the aperture 48 so as to operatively connect the control end of the cable 20 to the pivot member 44 so that operation of the control arm 21 of the second remote control unit 15 to longitudinally position the cable 20 will cause the pivot member 44 to be pivoted so as to control the operation of the pump 30.

It will, of course, be understood that a suitable anchoring sheath may be provided in the slot 33 of the guide means 31 of FIG. 5 so that the control ends of the first and second cables 19, 20 are both oriented parallel to one another toward the first and second end portions 45, 46 respectively of the pivot member 44 and both originate from the same general direction.

The unique pivot action produced by the cooperation of the control arm 35 and the pivot member 44 with the control cables 19 and 20 enables the control element 29 to be rotated in either the clockwise or counter-clockwise direction to control the forward or reverse operation of the hydrostatic pump 30 from either of first and second remote locations 14, 16 by means of the manually operable cable control units 13, 15. The operation of the remote control assembly of the present invention will be briefly described hereinbelow.

Figure 7:
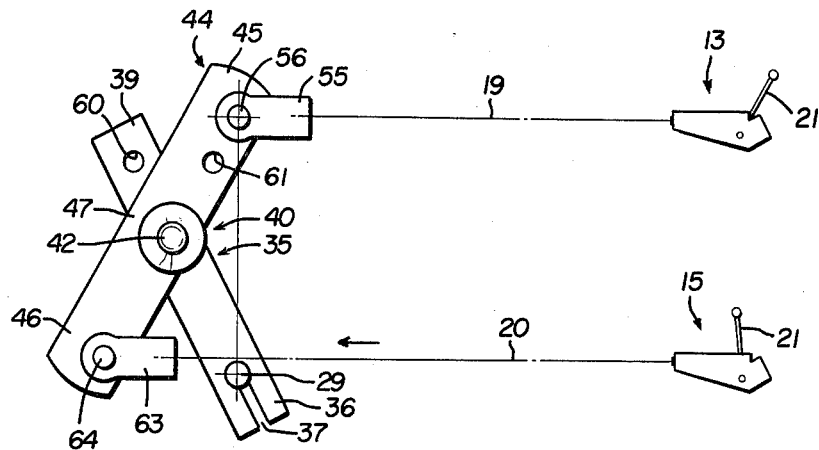
FIG. 7 is a schematic diagram of the preferred embodiment of the remote control assembly of the present invention depicting a situation wherein the first remote control unit is locked in the neutral position and the control element is rotated in one direction by the second remote control unit.

As shown in FIG. 7, the first remote control unit 13 has the control lever 21 positioned in the detent position so as to lock the control cable 19 in the neutral position, the control end 54 of the cable 19 will be locked in position and unable to move so that an axis through the point of attachment or connection of the cable 19 to the first end portion 45 of the link 44 which corresponds to the axis of the connecting pin 56 will establish or define a first fixed pivot axis about which the pivot member or link 44 is free to rotate. The second remote control unit 15 is then free to control the operation of the control element 29.

If the control lever 21 of the second remote control unit 15 is moved forward, the control cable 20 will be positioned longitudinally to the left and cause the second end portion 46 of the pivot member 44 to rotate in a clockwise direction with respect to the first defined pivot axis of the pin 56. Since the control arm 35 is pivotally connected to the intermediate portion 47 of the pivot member 44, the control arm 35 is rotated in a counter-clockwise direction about the longitudinal axis of the control element 29 thereby operating the hydrostatic pump 30 in a forward direction as required by the operator's positioning of the control lever 21.

Figure 8:
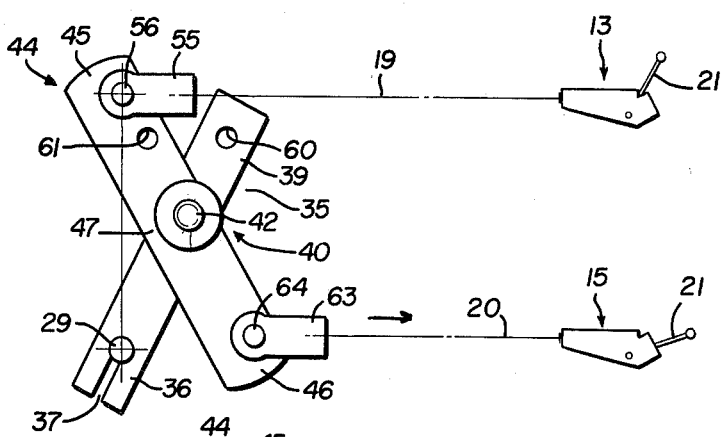
FIG. 8 is a schematic diagram of the preferred embodiment of the remote control assembly of the present invention depicting a situation wherein the first remote control unit is locked in a neutral position and the control element is operatively rotated in the opposite direction by the second remote control unit.

As depicted in FIG. 8, the control lever 21 of the first remote control apparatus may be locked in the neutral position so as to again define a first fixed pivot axis through the point of attachment of the cable 19 to the first end portion 45 of the pivot member 44, hence through the axis of the connecting pin 56. The pivot member 44 is therefore free to rotate about this first fixed pivot axis. When the control lever 21 of the second remote control unit 15 is moved in the reverse position, the control cable 20 moves to the right along its longitudinal axis and swings the second end portion 46 so that the pivot member or link 44 rotates in a counter-clockwise direction about the first fixed pivot axis. The movement of the pivot member 44 in this counter-clockwise direction causes the control arm 35 to rotate in a clockwise direction about the longitudinal axis of the control element 29 so as to operate the hydrostatic pump 30 in the desired reverse direction.

Figure 9:
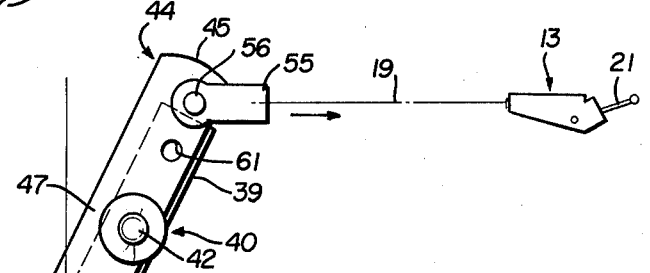
FIG. 9 is a schematic diagram of the preferred embodiment of the remote control assembly of the present invention depicting a situation wherein the second remote control unit is locked in a neutral position and the control element is operatively rotated in the opposite direction by the first remote control unit.
Figure 10:
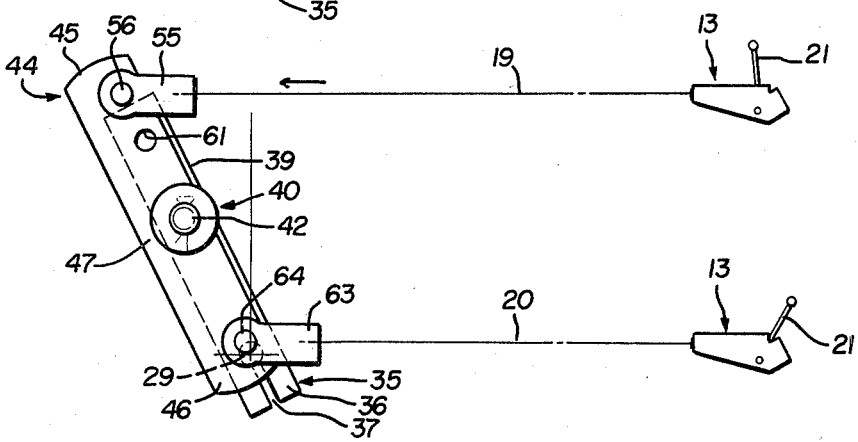
FIG. 10 is a schematic diagram of the preferred embodiment of the remote control assembly of the present invention depicting a situation wherein the second remote control unit is locked in a neutral position and the control element is operatively rotated in the first direction by the first remote control unit.

FIGS. 9 and 10 depict the operation of the control assembly 18 of the present invention when the control lever 21 of the second remote control unit 15 is locked in the detent position so as to lock or fix the position of the control cable 20. When the control cable 20 is locked in position, its control end will establish a second fixed pivot axis through the point of connection of the attachment yoke 63 to the opposite end portion 46 of the link 44 which will be along the axis of the connecting pin 64. This will hereinafter be referred to as the second fixed pivot axis. Once this axis is established, the control element 29 can be mechanically operated from the first remote control unit 13 by appropriate positioning the control lever 21.

In FIG. 9, the control lever 21 has been moved to the reverse position causing the control cable 19 to move along its longitudinal axis to the right as indicated by the arrow. Since the control end 54 of the cable 19 is connected to the first end portion 45 of the pivot member 44, the pivot member 44 is caused to rotate in a clockwise direction about the second fixed pivot axis. Since the control arm 35 is coupled to the intermediate portion 47 of the control member 44 via pivot means 40 and its first step portion 36 secured to the control element 29, the clockwise rotation of the pivot member 44 about the second fixed pivot axis will cause the control arm 35 to rotate in a similar clockwise direction about the axis of the control element 29 thereby causing the hydrostatic pump 30 to operate in the desired reverse mode as previously described.

Similarly, when the control lever 21 of the first remote control unit 13 is moved to the forward position, as indicated in FIG. 10, the cable 19 is moved along its longitudinal axis to the left. This causes the first end portion 45 of the pivot member 44 to be displaced as the pivot member 44 is rotated in a counter-clockwise direction about the second fixed pivot axis. Since the control arm 35 is coupled to the pivot member 44 through the pivot means 40, it too is caused to rotate in a counter-clockwise direction about the axis of the control element 29 causing the pump 30 to operate in the desired forward mode as previously described. Therefore, the unique arrangement of the control arm 35, pivot means 40 and pivot member 44 and their cooperation with the control cables 19 and 20 enable the control element 29 to be selectively rotated in either a clockwise or a counter-clockwise direction to control a mechanical device such as the hydrostatic pump 30 from either one of two separate and distinct remote locations. The remote control system of the present invention may be used so that it is normally sold or provided with only a single remote control unit 13 or 15, and the control assembly 18 is provided with the adapter assembly 57 so that the control element 29 may be mechanically operated from a single control unit.

If, however, it is desirable to be able to control the operation of attachments 12 of the tractor 11 from a location outside the cab 14 then a second remote control unit 13 or 15 may be added and the adapter assembly removed with a minimum of time and effort involved to convert the remote control system so that the control element 29 may be selectively controlled from either a first or second remote control location.

With this detailed description of the specific apparatus used to illustrate the preferred embodiment of the present invention and the operation thereof, it will be obvious to those skilled in the art that various modifications can be made in the remote control assembly of the present invention and in the specific structure and utilizations recited herein without departing from the spirit and scope of the present invention which is limited only by the appended claims.

I claim:

1. In a tractor-like vehicle having a hydrostatic pump for operating one or more tractor attachments, said hydrostatic pump having a pump control element whose rotation controls pump operation, and including a first remote pump control device disposed in a first predetermined area of the tractor vehicle and a second remote pump control device disposed in a second and different predetermined area of the tractor vehicle, each of the pump control devices having a manually-operable control lever positionable to a locked neutral position, a forward position and a reverse position, an improved remotely operable hydrostatic pump control assembly comprising:

a pivot means;

a control arm having a first portion secured to said pump control element for rotating same in a first direction for forward operation and in a second and opposite direction for reverse operation and a second portion spaced from said first portion for operatively carrying said pivot means;

a pivot member having an intermediate portion adapted to be pivotally attached to said pivot means for rotation with respect to said control arm;

first control cable means including a cable having one end operatively coupled to said first remote pump control device and the control end operatively connected to one end portion of said pivot member for defining a first fixed pivot axis through the point of connection whenever said control lever of said first remote pump control device is locked in said neutral position; and second control cable means including a cable having one end operatively coupled to said second remote pump control device and the control end operatively connected to the opposite end portion of said pivot member for defining a second fixed pivot axis through said point of connection whenever said control lever of said second remote pump control device is locked in said neutral position, said first control cable means being responsive to the control lever of said first remote pump control device being moved to said forward position for rotating said pivot member in said first direction about said second pivot axis such that said pivot means rotates said control arm in said first direction and responsive to the control lever of said first remote pump control device being moved to said reverse position for rotating said pivot member in said second direction about said second pivot axis such that said pivot means rotates said control arm in said second direction, said second control cable means being responsive to the control lever of said second remote pump control device being moved to said forward position for rotating said pivot member in said second direction about said first pivot axis such that said pivot means rotates said control arm in said first direction and responsive to the control lever of said second remote pump control device being moved to said reverse position for rotating said pivot member in said first direction about said first pivot axis such that said pivot means rotates said control arm in said second direction.

2. The improved pump control assembly of claim 1 wherein said control arm includes a step-shaped member having a first step portion adapted to be rigidly secured to said control element for rotating same to operate said hydrostatic pump, a second step portion generally parallel to said first step portion and adapted to operatively carry said pivot means and an intermediate portion integral with said first and second step portions and generally perpendicular thereto for rigidly connecting said step portions while spacing the plane of said second portion a predetermined distance away from the plane of said first step portion.

3. The improved pump control assembly of claim 2 wherein said pivot member includes a generally flat rectangular element having aperture means at disposed intermediate opposite end portions, said aperture means being adapted to receive said pivot means therethrough for rotatively mounting said pivot member for rotation with respect to said control arm.

4. The improved pump control assembly of claim 3 wherein said pivot means includes a pin member having one end portion fixedly secured to said second step portion of said control arm and extending outwardly therefrom such that an intermediate portion of said pin member is slideably received through said aperture means of said pivot member and fastening means are secured to the outer end portion of said pin element so that said pivot member is free to rotate about said intermediate portion of said pin member.

5. The improved pump control assembly of claim 1 wherein each of said first and second control cable means includes means for guiding said cable for longitudinal movement, said guide means including means for positioning the control end of said first and second control cables a predetermined spaced distance from one another such that said control ends are generally parallel to one another and extend in a single direction from said guide means toward the opposite end portions of said pivot member.

6. The improved pump control assembly of claim 3 further including means for rigidly securing the second step portion of said control arm to said first end portion of said pivot member to prevent relative motion therebetween so that said first remote pump control device can operate said hydrostatic pump alone whenever the cable means of said second remote pump control device is disconnected from said pivot member.

7. The improved pump control assembly of claim 6 wherein the second step portion of said control arm includes an aperture therethrough, the first end portion of said pivot member includes an aperture therethrough, and said securing means includes a sleeve member aligned with said apertures and disposed between said control arm and said pivot member and fastening means extending through said apertures and through said sleeve for rigidly connecting said control arm to said pivot member to prevent relative movement therebetween.

8. A remote control apparatus for selectively rotating a control element in a clockwise or counter-clockwise direction from either of first and second remote locations comprising:
pivot means;
a control arm having a first portion secured to said control element for rotating same and a second portion for carrying said pivot means;
a pivot member having first and second opposite end portions and an intermediate portion therebetween, said intermediate portion being rotatively supported on said pivot means for enabling said pivot member to rotate with respect to said control arm;
first cable control means including a first control cable having its control end operably coupled to said first end portion of said pivot member, said first cable control means being operable to define a neutral cable position wherein said first control cable is locked against a longitudinal movement and including a manually operable lever for longitudinally moving said first control cable back and forth to pivot said pivot member and rotate said control arm;
second cable control means including a second control cable having its control end operatively coupled to said second end portion of said pivot member, said second cable control means being operable to define a neutral cable position wherein said second control cable is locked against longitudinal movement and including a manually operable lever for longitudinally moving said second control cable selectively back and forth to pivot said pivot member and rotate said control arm, said first and second cable control means cooperating such that when said first cable control means is locked in said neutral position said second cable control means is operative to selectively rotate said control element and when said second cable control means is locked in said neutral position, said first cable control means is operative to selectively rotate said control element.

9. The remote control apparatus of claim 8 wherein said control arm includes a first generally planar portion to be rigidly secured to said control element for rotating same, a second generally planar portion which is generally parallel to said first portion which is adapted to operatively carry said pivot means, and an intermediate portion integral with opposite ends of said first and second portions and generally perpendicular to the planes thereof for spacing said second portion from said first portion.

10. The remote control apparatus of claim 9 wherein said pivot member includes a substantially flat generally rectangular element having a central aperture means intermediate the opposite ends thereof for receiving said pivot means therethrough to rotate said pivot member with respect to said control arm, the first end portion of said pivot member being adapted to operatively engage the control end of said first control cable and the opposite end portion of said pivot member being adapted to operatively engage the control end of said second control cable.

11. The remote control apparatus of claim 8 further including adapter means for rigidly securing said control arm to said pivot member to prevent relative movement therebetween so as to enable said first cable control means to selectively rotate said control element by itself whenever said second control cable is disconnected from said second end portion of said pivot member.

12. The remote control apparatus of claim 8 wherein each of said first and second cable control means includes a control lever manually positionable to a forward position, a neutral position, and a reverse position, one end of said control cable being operatively coupled to said control lever for longitudinally positioning said control cables as said lever is moved between said positions.

13. The remote control apparatus of claim 12 wherein said cable control means further includes means for longitudinally guiding said control cables and for positioning the control ends of said first and second control cables generally parallel to one another so that they are disposed toward said opposite end portions of said pivot member from a common direction thereby enabling the control lever of said first cable control means to selectively rotate said control element whenever the control lever of said second cable control means is in said neutral position, said first cable means being responsive to said first control lever being moved to a forward position for rotating said pivot member in a counter-clockwise directon about a first fixed pivot axis defined through the point of connection of the control end of said second control cable to the opposite end portion of said pivot member for rotating said control arm in said forward counter-clockwise direction and being responsive to the movement of said first control lever to said reverse position for rotating said pivot member in a clockwise direction about said first fixed pivot axis for rotating said control arm in said reverse clockwise direction, and for enabling the control lever of said second cable control means to selectively rotate said control element whenever the control lever of said first cable control means is in said neutral position, said second cable control means being responsive to said second control lever being moved to said forward position for rotating said pivot member in a clockwise direction about a second fixed pivot axis defined through the point of connection of the control end of said first control cable to the first end portion of said pivot member for rotating said control arm in said forward counter-clockwise direction and responsive to said second control lever being moved to said reverse position for rotating said pivot member in a counter-clockwise direction about said second fixed pivot axis for rotating said control arm in said reverse clockwise direction.

14. A remote control system for selectively rotating a control element clockwise and counter-clockwise to control the operation of a hydrostatic pump comprising:
   a first pump control means disposed at a first location remote from said hydrostatic pump, said first pump control means including a manually-operable lever selectively positionable toward and away from a neutral position and a first control cable means responsive to the positioning of said lever for longitudinally moving a first cable element;
   a second pump control means disposed at a second location remote from said hydrostatic pump, said second pump control means including a manually-operable lever selectively positionable toward and away from a neutral position and a second control cable means responsive to the positioning of said lever for longitudinally moving a second cable element;
   a pivot means;
   a control arm having a first portion attached to said control element for rotating same and a second portion for operatively carrying said pivot means;
   a pivot member pivotally mounted on said pivot means about an intermediate portion thereof for rotating opposite end portions with respect to said control arm;
   said first cable element being operatively connected to a first end portion of said pivot member and said second cable element being operatively connected to an opposite end portion of said pivot member such that said first pump control means is operative to pivot said pivot member about a first fixed pivot axis defined through a point of connection of said second cable element to said opposite end portion of said pivot member when said second control lever is in said neutral position to selectively rotate said control arm to operate said hydrostatic pump and said second pump control means is operative to pivot said pivot member about a second fixed pivot axis defined through the point of connection of said first cable element to said first end portion of said pivot member when said first lever is in said neutral position to selectively rotate said control arm to operate said hydrostatic pump.

15. The remote control system of claim 14 wherein said pivot member includes a substantially flat generally rectangular element having a central aperture means intermediate the end portions thereof for receiving said pivot means therethrough, aperture means at said first end portion thereof for operatively engaging the control end of said first cable element and aperture means in said opposite end portion thereof for operatively engaging the control end of said second cable element and said pivot means includes a pivot pin fixedly carried by said control arm and passing through the aperture means of said pivot member such that said pivot member is free to rotate with respect to said control arm about said pivot element.

16. The remote control system of claim 15 wherein said control arm includes a generally flattened S-shaped member having a first generally flat portion adapted to be rigidly secured to said control element, a second generally flat portion substantially parallel to said first portion and adapted to mount said pivot element, and an intermediate portion integral with said first and second portions and generally perpendicular thereto for spacing the plane of said second portion from the plane of said first portion.

17. A remote control system for selectively rotating a control element clockwise and counter-clockwise about its longitudinal axis to control the operation of a mechanical device comprising:
   a control arm having first and second portions spaced from one another, said first portion being adapted to be secured to said control element for rotating same;
   a link pivotally mounted on said second portion of said control arm intermediate opposite end portions of said link;
   first manually operable remote control means coupled to one end portion of said link for selectively pivoting said link about its opposite end portion to control the direction of rotation of said control arm for selectively operating said mechanical device; and
   second manually operable remote control means coupled to the opposite end portion of said link for selectively pivoting said link about said one end portion to selectively control the direction of rotation of said control arm to control the operation of said mechanical device thereby enabling said mechanical device to be operated from either of said first or second remote control means.

18. The remote control system of claim 17 wherein said control arm includes a substantially flattened generally S-shaped element having a first portion adapted to be rigidly secured to said control element for rotating same, a second portion generally parallel to said first portion and disposed in a direction opposite thereto, said second portion including a pivot element operatively carried thereby and an intermediate portion integral with said first and second portions for spacing the plane of said second portion a predetermined distance from the plane of said first portion.

19. The remote control system of claim 18 wherein said link includes a substantially flat generally rectangular element having aperture means through the intermediate portion thereof for receiving said pivot element therethrough to enable said link to be pivotally rotated with respect to said control arm.

20. The remote control system of claim 17 wherein each of said first and second remote control means includes a remotely located manually operable lever having a self-locking neutral position, said lever being positionable in forward and reverse directions with respect to said neutral position and a control linkage having one end associated with said control lever and its opposite end adapted to be moved longitudinally as said control lever is selectively positioned.

21. The remote control system of claim 20 wherein said remote control means includes means for guiding said control linkages such that said opposite ends of said first and second control linkages are positioned parallel to one another and from the same general direction such that the opposite end of said first control linkage is adapted to be operatively secured to said first end portion of said link and the opposite end of said second control linkage is adapted to be operatively connected to the opposite end portion of said link.

22. The remote control system of claim 17 further including adapter means for rigidly coupling said control arm to said link to prevent relative movement therebetween to enable said control arm to be selectively rotated solely by said first manually operable remote control means whenever said second manually-operable remote control means is disconnected from said opposite end of said link.

* * * * *